(12) United States Patent
Subraveti et al.

(10) Patent No.: US 12,530,389 B2
(45) Date of Patent: Jan. 20, 2026

(54) MACHINE LEARNING MODELS FOR GENERATING TAGS IN UNSTRUCTURED TEXT

(71) Applicant: Ancestry.com Operations Inc., Lehi, UT (US)

(72) Inventors: Suraj Subraveti, San Francisco, CA (US); Maria Antonia Fabiano, Austin, TX (US); Gopalkrishna Balkrishna Veni, Lehi, UT (US); Yingrui Yang, San Mateo, CA (US)

(73) Assignee: Ancestry.com Operations Inc., Lehi, UT (US)

( * ) Notice: Subject to any disclaimer, the term of this patent is extended or adjusted under 35 U.S.C. 154(b) by 149 days.

(21) Appl. No.: 18/219,584

(22) Filed: Jul. 7, 2023

(65) Prior Publication Data
US 2024/0012844 A1 Jan. 11, 2024

Related U.S. Application Data

(60) Provisional application No. 63/359,206, filed on Jul. 8, 2022.

(51) Int. Cl.
*G06F 16/35* (2025.01)
*G06F 16/38* (2019.01)
*G06N 3/09* (2023.01)

(52) U.S. Cl.
CPC .............. *G06F 16/35* (2019.01); *G06F 16/38* (2019.01); *G06N 3/09* (2023.01)

(58) Field of Classification Search
CPC ........ G06F 16/35; G06F 16/38; G06F 40/169; G06F 40/284; G06F 40/30; G06N 3/09;
(Continued)

(56) References Cited

U.S. PATENT DOCUMENTS 9,235,563 B2 * 1/2016 Rose ................. G06F 16/35
2010/0287162 A1 * 11/2010 Shirwadkar .......... G06F 16/345
707/750

(Continued)

OTHER PUBLICATIONS

Toleu, Alymzhan, Gulmira Tolegen, and Rustam Mussabayev. "Keyvector: Unsupervised keyphrase extraction using weighted topic via semantic relatedness." Computación y Sistemas 23.3 (2019): 861-869. (Year: 2019).*

(Continued)

*Primary Examiner* — Dennis Truong
(74) *Attorney, Agent, or Firm* — Keller Preece PLLC

(57) ABSTRACT

Disclosed herein relates to a method that analyzes the sentiment of user feedback for a genealogical system and identifies key phrases that may relate to novel themes in the user feedback. Sentiment analysis and novel theme prediction systems, methods, and computer-program products are described. Sentiment analysis of user feedback may include dividing user-generated unstructured text files into sections. The method classifies each section to an aspect of the genealogical system from a predetermined list of aspects monitored by the genealogical system. The method inputs the text belonging to the classified section to a supervised machine learning model and determines a sentiment associated with the classified section. In other embodiments, a method generates embedding vectors representing survey responses from users of a genealogical system. The method extracts a subset of survey responses having embedding vectors grouped into one cluster. The method extracts key phrases that may indicate a novel theme.

13 Claims, 7 Drawing Sheets

(58) Field of Classification Search
CPC .... G06N 3/0442; G06N 3/0464; G06N 3/048; G06N 7/01; G06N 3/045; G06N 3/084; G06N 20/10
See application file for complete search history.

(56) References Cited

U.S. PATENT DOCUMENTS

| | | | |
|---|---|---|---|
| 2017/0228414 A1* | 8/2017 | Shazeer | G06F 40/44 |
| 2017/0351677 A1* | 12/2017 | Chaubal | G06F 16/248 |
| 2018/0336183 A1* | 11/2018 | Lee | G06N 5/022 |
| 2019/0155944 A1* | 5/2019 | Mahata | G06F 16/93 |
| 2020/0342016 A1* | 10/2020 | Morris | G06F 40/295 |
| 2021/0303638 A1* | 9/2021 | Zhong | G06F 40/169 |
| 2022/0261545 A1* | 8/2022 | Lauber | G06F 40/216 |
| 2022/0269939 A1* | 8/2022 | Zhao | G06F 40/30 |
| 2023/0259708 A1* | 8/2023 | Pouran Ben Veyseh | G06F 40/30 704/232 |
| 2023/0289377 A1* | 9/2023 | Chopra | G06T 11/206 |

OTHER PUBLICATIONS

Li, Jiwei, et al. "A diversity-promoting objective function for neural conversation models." arXiv preprint arXiv:1510.03055 (2015). (Year: 2015).*

* cited by examiner

MACHINE LEARNING MODELS FOR GENERATING TAGS IN UNSTRUCTURED TEXT

CROSS-REFERENCE TO RELATED APPLICATION

The present application claims the benefit of U.S. Provisional Patent Application No. 63/359,206 filed on Jul. 8, 2022, which is hereby incorporated by reference in its entirety.

FIELD

The disclosed embodiments relate to machine learning model systems configured to extract useful information from unstructured data used a genealogical system, as well as to identify novel features from user generated unstructured data concerning the genealogical system.

BACKGROUND

A large-scale database such as a genealogy database can include billions of data records. This type of database may allow users to build family trees, research their family history, and make meaningful discoveries about the lives of their ancestors. Users may try to identify relatives with datasets in the database. However, identifying relatives in the sheer amount of data is not a trivial task. Datasets associated with different individuals may not be connected without a proper determination of how the datasets are related. Comparing a large number of datasets without a concrete strategy may also be computationally infeasible because each dataset may also include a large number of data bits. Given an individual dataset and a database with datasets that are potentially related to the individual dataset, it is often challenging to identify a dataset in the database that is associated with the individual dataset.

It is beneficial for user sentiment to be analyzed from user feedback regarding the genealogy database. Users may provide insight from comments or survey responses. User sentiment is difficult to extract from comments and responses on a granular level due to receiving large amounts of unstructured text. Manually sorting through user comments and feedback for every feature of a genealogy system is insurmountable. Further, identifying novel features between user feedback may benefit the development of the genealogy system. However, manually identifying novel features in user survey responses is not efficient or feasible on a large scale.

SUMMARY

Disclosed herein relates to example embodiments that identify key phrases in survey responses from users of a genealogy system. In some embodiments, a system receives a plurality of survey responses of a genealogical system. The system generates several embedding vectors representing the survey responses, with each embedding vector representing the semantic characteristics of the survey responses. The system groups the embedding vectors into clusters. The system extracts a subset of survey responses that correspond to embedding vectors grouped into one of the clusters. The system identifies phrases in the subset of survey responses that represent key phrases that are automatically extracted from the subset of survey responses.

In another example embodiment, a system stores sentiments associated with aspects of the genealogical system. The system receives a set of user-generated unstructured text files related to usage of the genealogical system. Each unstructured text file may include several strings of text that are input by a user of the genealogical system. The system divides the unstructured text files into one or more sections. The sections are classified to an aspect of the genealogical system from a list of aspects monitored by the genealogical system. The text belonging to the classified section is input to a supervised machine learning model. The supervised machine learning model determines a sentiment associated with the classified section and stores the sentiment associated with the aspect of the genealogical system as a metadata tag associated with the user-generated unstructured text file(s).

In yet another embodiment, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

Figure 1:
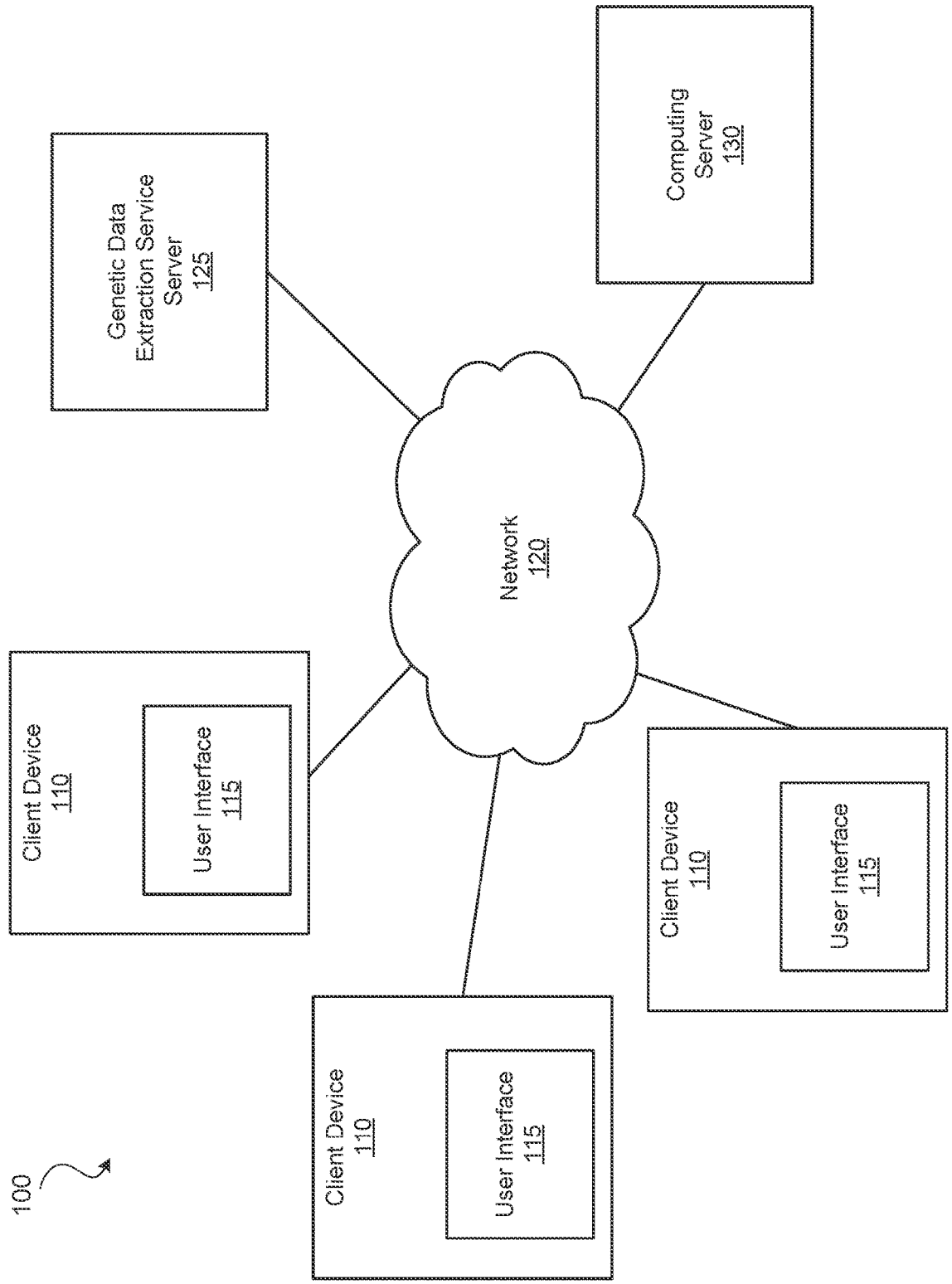
FIG. 1 illustrates a diagram of a system environment of an example computing system, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

The genealogical system may be updated and modified with new modules, features, user interfaces, and other aspects. Changes may take place with pricing, user interactions, and other user-facing aspects. In view of these alterations and updates, it is beneficial to have some grasp on user sentiment towards various aspects of the genealogical system. The genealogical system may allow for the collection of user feedback through surveys, polls, comment boxes, and other methods of feedback collection. However, large texts from many users are too vast for manual analysis. Additionally, it is difficult to preempt the aspects and topics that an automated system should search for in a mass of user feedback. Therefore, the genealogical system may be improved by the automated analysis of user sentiment from user feedback as well as a dynamic system for identifying and extracting new aspects of user feedback.

Systems, methods, and computer readable mediums described herein allow for sentiment analysis of user feedback. In some embodiments, a list of aspects are predetermined for monitoring by the genealogical system. User feedback from surveys and other responses may be analyzed and classified with monitored aspects of the genealogical system. A machine learning model may be used to perform sentiment analysis on the feedback and the resulting sentiment is stored with the feedback. In some embodiments, a system receives user feedback and uses a clustering process to extract key phrases indicating aspects of the genealogical system. The system embeds survey responses into vectors and groups them into clusters. The system extracts a subset of survey responses grouped into one of the clusters and identifies phrases in the subset of survey responses. The system may identify aspects of the genealogical system that are common to user feedback, indicating parts of the genealogical system that may require updating or modification.

Example System Environment

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more sub-networks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, and phenotypes are examples of biomarkers. In some embodiments, each SNP site may have two readings that are heterozygous.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2:
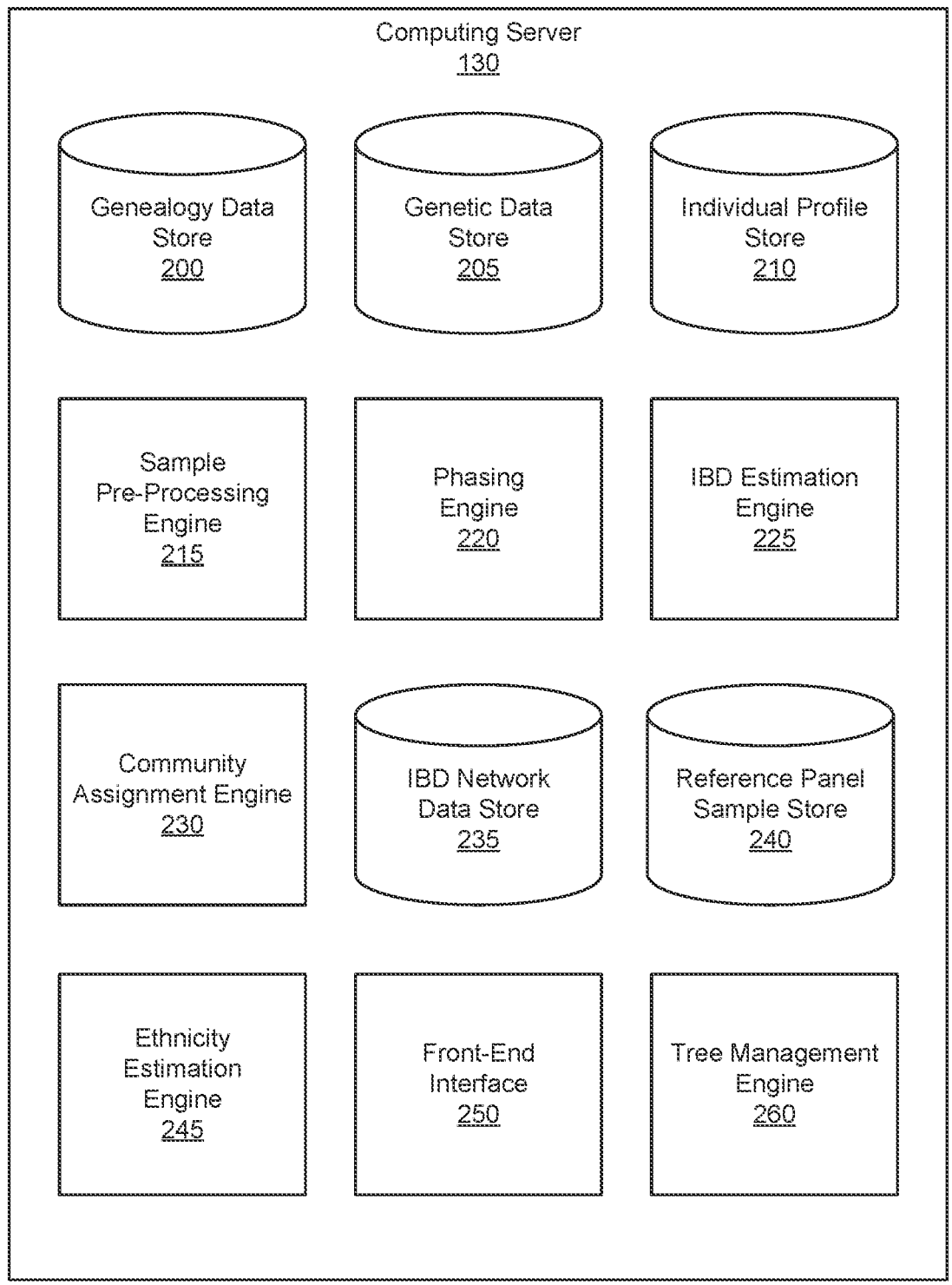
FIG. 2 is a block diagram of an architecture of an example computing system, in accordance with some embodiments.

FIG. 2 is a block diagram of an architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 250, and a tree management engine 260. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP sites (e.g., allele sites) filtered from the sequencing results. A SNP site that is single base pair long may also be referred to a SNP locus. A SNP site may be associated with a unique identifier. The genetic dataset may be in a form of diploid data that includes a sequencing of genotypes, such as genotypes at the target SNP site, or the whole base pair sequence that includes genotypes at known SNP site and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g., stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and research conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user. The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing.

A phasing algorithm may also generate phasing result that has a long-distance accuracy in terms of haplotype separation. For example, in some embodiments, a jig phasing algorithm may be used, which is described in further detail in U.S. Patent Application Publication No. US 2021/0034647, entitled "Clustering of Matched Segments to Determine Linkage of Dataset in a Database," published on Feb. 4, 2021. For example, the computing server 130 may receive a target individual genotype dataset and a plurality of additional individual genotype datasets that include haplotypes of additional individuals. For example, the additional individuals may be reference panels or individuals who are linked (e.g., in a family tree) to the target individual. The computing server 130 may generate a plurality of sub-cluster pairs of first parental groups and second parental groups. Each sub-cluster pair may be in a window. The window may correspond to a genomic segment and has a similar concept of window used in the ethnicity estimation engine 245 and the rest of the disclosure related to HMMs, but how windows are precisely divided and defined may be the same or different in the phasing engine 220 and in an HMM. Each sub-cluster pair may correspond to a genetic locus. In some embodiments, each sub-cluster pair may have a first parental group that includes a first set of matched haplotype segments selected from the plurality of additional individual datasets and a second parental group that includes a second set of matched haplotype segments selected from the plurality of additional individual datasets. The computing server 130 may generate a super-cluster of a parental side by linking the first parental groups and the second parental groups across a plurality of genetic loci (across a plurality of sub-cluster pairs). Generating the super-cluster of the parental side may include generating a candidate parental side assignment of parental groups across a set of sub-cluster pairs that represent a set of genetic loci in the plurality of genetic loci. The computing server 130 may determine a number of common additional individual genotype datasets that are classified in the candidate parental side assignment. The computing server 130 may determine the candidate parental side assignment to be part of the super-cluster based on the number of common additional individual genotype datasets. Any suitable algorithms may be used to generate the super-cluster, such as a heuristic scoring approach, a bipartite graph approach, or another suitable approach. The computing server 130 may generate a haplotype phasing of the target individual from the super-cluster of the parental side.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020 and U.S. Pat. No. 10,692,587, granted on Jun. 23, 2020, entitled "Global Ancestry Determination System" describe different example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and those in the potential family trees through one or more machine learning models or other heuristic algorithms. For example, the tree management engine 260 may try putting the target individual in various possible locations in the family tree and determine the highest probability position(s) based on the genetic dataset of the target individual and genetic datasets available for others in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Pat. No. 11,429,615, entitled "Linking Individual Datasets to a Database," granted on Aug. 30, 2022, describes example embodiments of how an individual may be linked to existing family trees.

Example Systems for Analyzing User Sentiment from Feedback

Figure 3A:
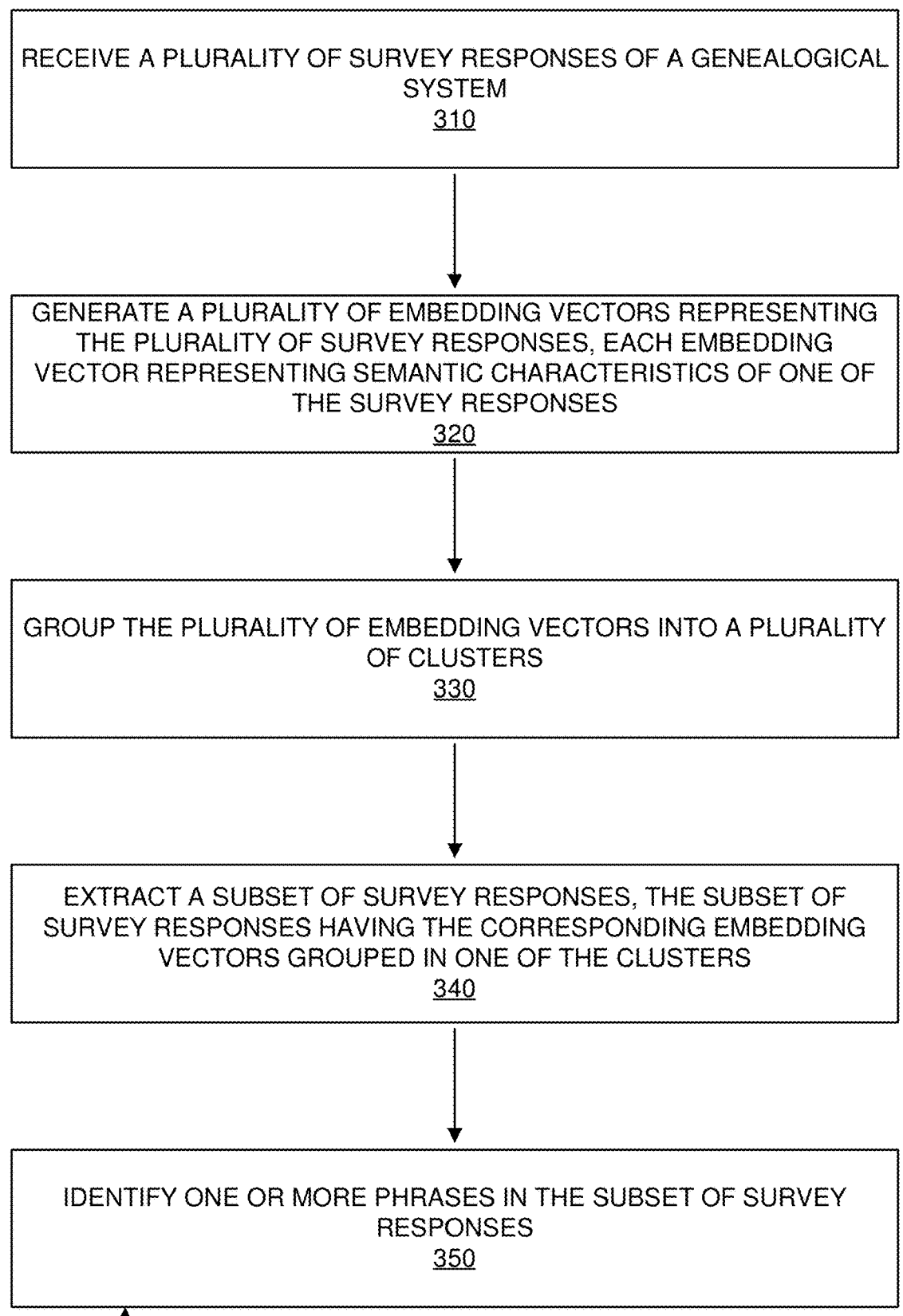
FIGS. 3A and 3B are flowcharts depicting example methods for determining user sentiments towards features of a genealogical system from survey responses, in accordance with some embodiments.

FIG. 3A is a flowchart depicting a machine learning process 300 for the computing server 130 to automatically extract key phrases from survey responses, in accordance with some embodiments. Survey responses may be input by users of a genealogical system, such as customers of a genealogical database. In some embodiments, the survey responses are unstructured text files with strings of text. A user may provide survey responses to evaluate their experience of using the genealogical system. In some embodiments, the computing server 130 may prompt a user to provide survey responses at set time intervals (e.g., every week, every month, every year, etc.). The computing server 130 may provide an option for users to provide survey responses each time the user uses the genealogical system (e.g., by providing a comment box on the user interface 115). While a genealogical system is used as an example for using the process 300, other online systems may also use the process 300 to extract key phrases from survey responses or other unstructured text. Survey responses are only examples of unstructured text. In some cases, survey responses may also include structured parts such as forms and options of predetermined choices.

In some embodiments, unsupervised learning techniques may be used in the process 300 so that key phrases may be extracted without any training data. In some embodiments, the process 300 may be used to complement a supervised learning model that looks for a fixed set of tags and is trained in a supervised manner to detect tags and sentiments.

The computing server 130 may have models deployed in production that only look for a fixed set of tags/topics for each survey response. Models may be configured to identify key tags associated with established topics related to the genealogical system. While this may be useful, the ability to detect the presence of novel themes in user responses is also beneficial. It may be beneficial to detect novel themes that do not frequently occur or are not anticipated, but still provide helpful information for analysis. The computing server 130 may be configured to identify novel themes that are not fixed. For example, a model may detect the presence of the phrase "complex" and an associated negative sentiment with it. However, the model does not provide the computing server 130 with information on why users are not happy with the price. In order to determine the reason for user dissatisfaction with a price, the computing server 130 may search to detect relevant novel themes, such as a price update or an emerging competitor with lower costs.

Users may provide negative feedback for a variety of reasons. For example, users may provide negative feedback in association with a global pandemic, the availability of a cheaper service from a competitor, a confusing user interface, or other reasons. Users may also provide positive feedback in response to a price change, new features, new layouts on a user interface, and other reasons. In one example, a new product feature X, is released. If a pre-defined set of tags of the computing server 130 is not looking for the specific theme of feature X, then the computing server 130 may not gather adequate insight into customer feedback/thoughts about feature X. In cases where pre-defined sets of tags are not adequate, the computing server 130 needs models to detect themes that are not predetermined or "fixed," hence the computing server 130 needs unsupervised models. Process 300 is an example approach that allows the computing server 130 to detect various themes.

Process 300 may include a text clustering process. The computing server 130 attempts to group together survey responses into distinct categories based on topical similarity. For this, the computing server 130 may represent the survey responses as vectors. These representations may be generated in a way that preserves the topical similarity (e.g., responses that are similar in topic are represented by vectors that are closer together, so the computing server 130 may use cosine similarity as a distance metric), and responses that are different are represented by vectors that are far away. In various embodiments, the computing server 130 may use different ways to achieve this as described below (e.g., TF-IDF, using word embeddings, large-scale language models (e.g., large language model LLM), etc.). After the computing server 130 generates these vectors for its survey responses, the computing server 130 then clusters them together using a machine learning clustering approaches such as KMeans, followed by rankings in grams from these clusters to generate key phrases.

In some embodiments, the computing server 130 may receive 310 a plurality of survey responses of a genealogical system. In some embodiments, the survey responses include a paragraph of text. Survey responses may be user-provided answers to prompts about the genealogical system. Users may provide single-word feedback, sentences, paragraphs, or some combination thereof.

The computing server 130 generates 320 a plurality of embedding vectors representing the plurality of survey responses. Each embedding vector may represent the semantic characteristics of one of the survey responses. In some embodiments, the words of the textual content are mapped into vectors using different embedding techniques such as term frequency-inverse document frequency (TF-IDF) vectorization, continuous big-of-words (CBOW) model, and/or skip-gram model. The mapping process may be conducted through a supervised or unsupervised neural network. The generation of the word vectors is based on aggregated word-to-word co-occurrence statistics from a corpus. A corpus may be selected from a collection of open-source data sources, a collection of textual content of the survey responses stored in computing server 130 and may additionally include other sources of text from books, publications, online articles, advertisements, etc. to provide additional training to a neural network that performs the word vector generation. Each word vector generated corresponds to a word and represents the semantic correlation, similarity, and difference of the word with respect to other words in the corpus. Techniques such as TF-IDF vectorization may be used to penalize the weight of common words such as articles, prepositions, and conjunctions that carry little significance in defining the semantic characteristics of a text.

The generation of an embedding for each survey response can be achieved in several ways. In some embodiments, after the words of a survey response are converted into word vectors, an average of all the word vectors is calculated to generate a common vector with a specific direction and magnitude. The average can be a simple average or a weighted average. For example, the weighted average may be calculated based on the number of occurrences of a word in the survey response. Techniques such as TF-IDF vectorization may be used to reduce the weight of common words that do not carry much semantic significance. The averaged vector represents an overall semantic characteristic of the textual content of the survey response in the form of a mathematical vector. An averaged vector may serve as the embedding of the survey response. In some embodiments, rather than taking the average of all word vectors of a survey response, a certain number (e.g., ten) of top semantically significant word vectors of the survey responses are selected to generate an averaged vector.

In another embodiment, the generation of an embedding for each survey response may be carried out through a neural network. The neural network can be a deep neural network that includes an input layer, an output layer, and one or more hidden intermediate layers. Each layer includes one or more nodes that are connected to other layers. A layer receives inputs from a preceding layer and produces outputs for a succeeding layer. In one case earlier layers (e.g., layers closer to the input layer) are configured to capture syntactic meanings of the textual content, while later layers (e.g., layers closer to the output layer) are configured to capture semantic meanings of the textual content. The layers of the neural network perform recognition of syntactic and/or semantic features by convolution, clustering, classification, matching, and/or the like. The neural network is configured to receive the textual content of the survey response or the word vectors of the survey response as an input. The neural network is configured to output a vector that represents the semantic characteristic of the textual content of an item after the input is analyzed through multiple layers and nodes. The output vector represents the semantic characteristic of the textual content and is served as the embedding of the survey response.

By way of example, the computing server 130 may use one or more approaches below to represent survey responses as vectors in a multi-dimensional space.

In some embodiments, the computing server 130 may use averaged GloVe embeddings of words. The computing server 130 may consider responses as a set of words and use a popular embedding algorithm, such as GloVe, to represent the words and average these embedding to obtain an embedding for a given survey response. This is an efficient approach but may have the drawback of not considering the order in which words occur in the response. The order of words in the survey response may still be informative. The GloVe approach is implemented in the sentence-transformer package.

In some embodiments, the computing server 130 uses a Universal Sentence Encoder. This model is implemented in TensorFlow Hub and may be another useful way to obtain representations for text units that are bigger than words (e.g., sentences, paragraphs, etc.). The computing server 130 may use the Deep Averaging Network (DAN) embeddings, where word embeddings are averaged and passed through a feedforward neural network and are trained for any downstream task (in this case, semantic textual similarity). In some embodiments, this approach may be similar to the model used in GloVe embeddings, except that Universal Sentence Encoder embeddings are tuned towards the semantic textual similarity tasks.

In some embodiments, the computing server 130 uses SentenceBERT based embeddings. SentenceBERT (SBERT) based embeddings are a RoBERTa based model used to embed sentences, specifically tuned for semantic textual similarity. RoBERTa based encoders are fine-tuned using sentence pairs for the semantic textual similarity tasks. SBERT works by adding a pooling operation on top of the output embeddings from BERT/RoBERTa networks to get a representation for a sentence. The computing server 130 may fine-tune the weights of the network with siamese/triplet networks for either classifying similar and dissimilar sentence pairs, or by minimizing the distance between embeddings for similar sentences and maximizing the distance between dissimilar sentences. This model may also be available for use in the sentence-transformers package.

The computing server 130 may group 330 the plurality of embedding vectors into a plurality of clusters. In some embodiments, grouping the plurality of embedding vectors into a plurality of clusters may include defining an objective function that measures metrics of potential clusters and iteratively defining the potential clusters to change values of the objective function based on a training goal. For example, K-means clustering may be used. The metrics of the objective function are distances among the embedding vectors in a potential cluster. The training goal may be decreasing or minimizing the distances among the embedding vectors in a potential cluster.

In some embodiments, the computing server 130 uses a KMeans algorithm to cluster response embeddings. In some embodiments, the computing server 130 may not know the number of topics in advance. Instead, the computing server 130 chooses a k from a range of values that gives the minimum silhouette score. This can also be used as an evaluation metric to compare the performance of different approaches.

Figure 4:
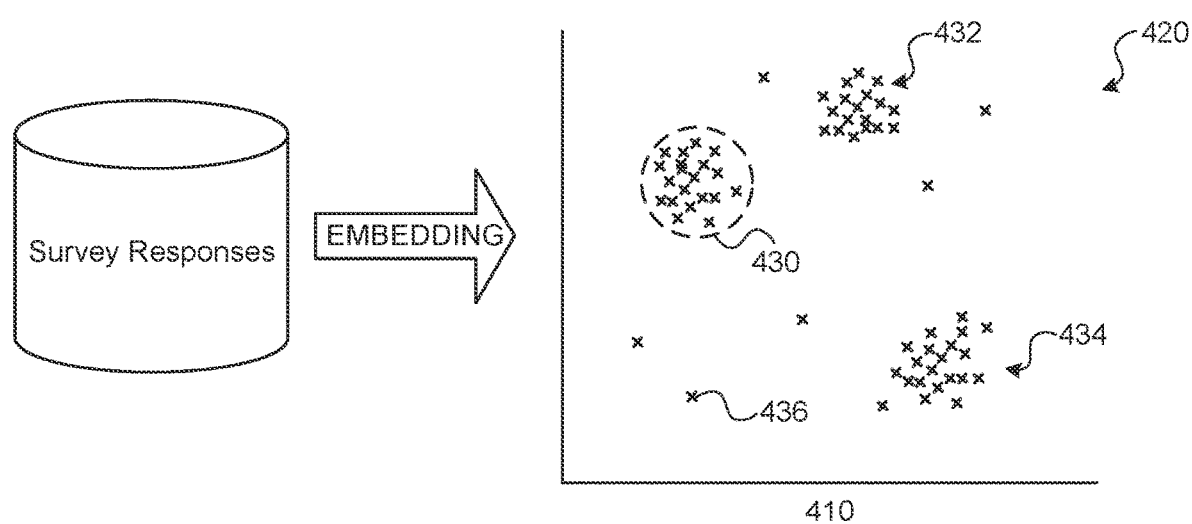
FIG. 4 illustrates an example embedding space generated from survey responses, in accordance with some embodiments.

FIG. 4 is a visual representation of an example embedding space 420 that includes the embeddings generated from survey responses. It should be noted that the two-dimensional chart 410 may be a simplified representation of the embedding space 420. The embedding space 420 can be an N-dimensional latent space that includes embeddings having N dimensions. The marks in chart 420 represent the data points of the embeddings with each embedding having a direction and a magnitude. For example, each mark may represent the direction and the magnitude of an embedding from the origin. Some of the embeddings may be grouped in different clusters, as represented by example clusters 430, 432, and 434. Since the embeddings are generated based on the semantic characteristics of each corresponding textual content, clusters 430, 432, and 434 may represent groups of survey responses that have similar textual content.

The grouping of two or more items into a cluster may be based on the distances among the embeddings of the survey responses in the embedding space 420. For example, an algorithm may be employed to determine whether or not a plurality of embeddings are statistically likely to belong to a cluster based on the distances of those embeddings between each other with respect to other embeddings in the entire embedding space 420. The volume of a space occupied by those embeddings is calculated and the density of the space is determined. Whether the plurality of embeddings constitutes a cluster is then determined based on how densely occupied the space is relative to other groups of embeddings in the embedding space 420. Also, by way of example, an algorithm may start with an embedding in the embedding space 420 and determine how many embeddings are located within a certain distance of the started embedding. The density around the started embedding is then compared to the densities of other embeddings to determine whether some of the embeddings are clustered. In some cases, the determination of clusters may alternatively or additionally involve the use of other statistical techniques such as principal component analysis.

After a cluster of embeddings is identified, the textual content of the corresponding survey responses is further analyzed. Referring back to FIG. 3A, the computing server 130 may extract 340 a subset of survey responses. The subset of survey responses has the corresponding embedding vectors grouped in one of the clusters. In some examples, the subset of survey responses could concern a potential novel feature.

The computing server 130 may identify 350 one or more phrases in the subset of survey responses. The one or more phrases represent key phrases that are automatically extracted from the subset of survey responses. In some embodiments, identifying one or more phrases in the subset of survey responses includes generating a plurality of candidate keyphrase vectors. Each keyphrase vector may be one or more words extracted from the subset of the survey responses belonging to one of the clusters. The computing server 130 may identify one or more of the candidate keyphrase vectors that are most similar to one of the clusters. In some embodiments, the plurality of candidate keyphrase vectors are generated using a sliding window approach that goes through the text of the survey responses in the subset. For example, an N-gram approach may be used. In some embodiments, identifying one or more of the candidate keyphrase vectors that are most similar to one of the clusters is based on a cosine similarity between a candidate keyphrase vector and the center of one of the clusters.

By way of example, the computing server 130 uses an approach to extract the key phrases that summarizes the responses in each cluster. In some embodiments, the computing server 130 may concatenate all the responses from a cluster to create a "cluster document." The computing server 130 then uses the embedding models to generate the embedding for the clustering document. To extract key phrases, the computing server 130 may embed all possible 1-3 grams (in N-gram approach) of the cluster document (candidate key phrases) and rank them based on a metric associated with cosine similarities. The computing server 130 may use cosine similarity or maximal marginal relevance (MMR) in identifying key phrases.

For example, after the computing server 130 generates embeddings for candidate key phrases, the computing server 130 can naively rank them based on cosine similarity. One issue with this approach is that the extracted key phrases are very similar to each other as each cluster can cover multiple topics. Due to potential similarities of key phrases, rankings based on cosine similarity alone may lead to the top key phrases representing only one topic that constitutes a majority topic. To avoid this and ensure that the key phrases are diverse, the computing server 130 may have a slightly different objective function called Maximal Marginal Relevance (MMR). The objective of MMR is to iteratively extract key phrases that are most similar to the cluster document, as well as the most different key phrases that have already been extracted. The computing server 130 can control the "diversity" of the key phrases using the lambda parameter in the equation below:

$$MMR := \underset{C_i \in C \backslash K}{\operatorname{argmax}} \left[ \lambda \cdot \widetilde{cos_{sim}}(C_i, doc) - (1-\lambda)_{C_j \in K}^{max} \widetilde{cos_{sim}}(C_i, C_j) \right],$$

After extracting the top key phrases (e.g., top 10 key phrases) for each cluster, the computing server 130 may determine which of the key phrases fits for each of the responses by computing cosine similarities of key phrases and the individual responses.

The computing server 130 may use a wide variety of machine learning techniques for natural language processing. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used. For example, key phrases extraction from survey responses may apply various unsupervised techniques such as clustering and neural networks to generate embeddings.

In various embodiments, the training techniques for a machine learning model may be supervised, semi-supervised, or unsupervised. In supervised learning, the machine learning models may be trained with a set of training samples that are labeled. In some cases, an unsupervised learning technique may be used. The samples used in the training of unsupervised learning techniques are not labeled. Various unsupervised learning techniques may be used, such as clustering. In some cases, the training may be semi-supervised with training sets having a mix of labeled samples and unlabeled samples.

A machine learning model may be associated with an objective function, which generates a metric value that describes the objective goal of the training process. For example, the training may intend to reduce the separation of vectors in a cluster. In such a case, the objective function may monitor the distances among the vectors in clusters. In supervised learning, the objective function of the machine learning algorithm may be the training error rate. Such an objective function may be called a loss function. Other forms of objective functions may also be used, particularly for unsupervised learning models whose error rates are not easily determined due to a lack of labels. In various embodiments, the distances among vectors may be determined by absolute Euclidean distance or root mean square distance.

Figure 3B:
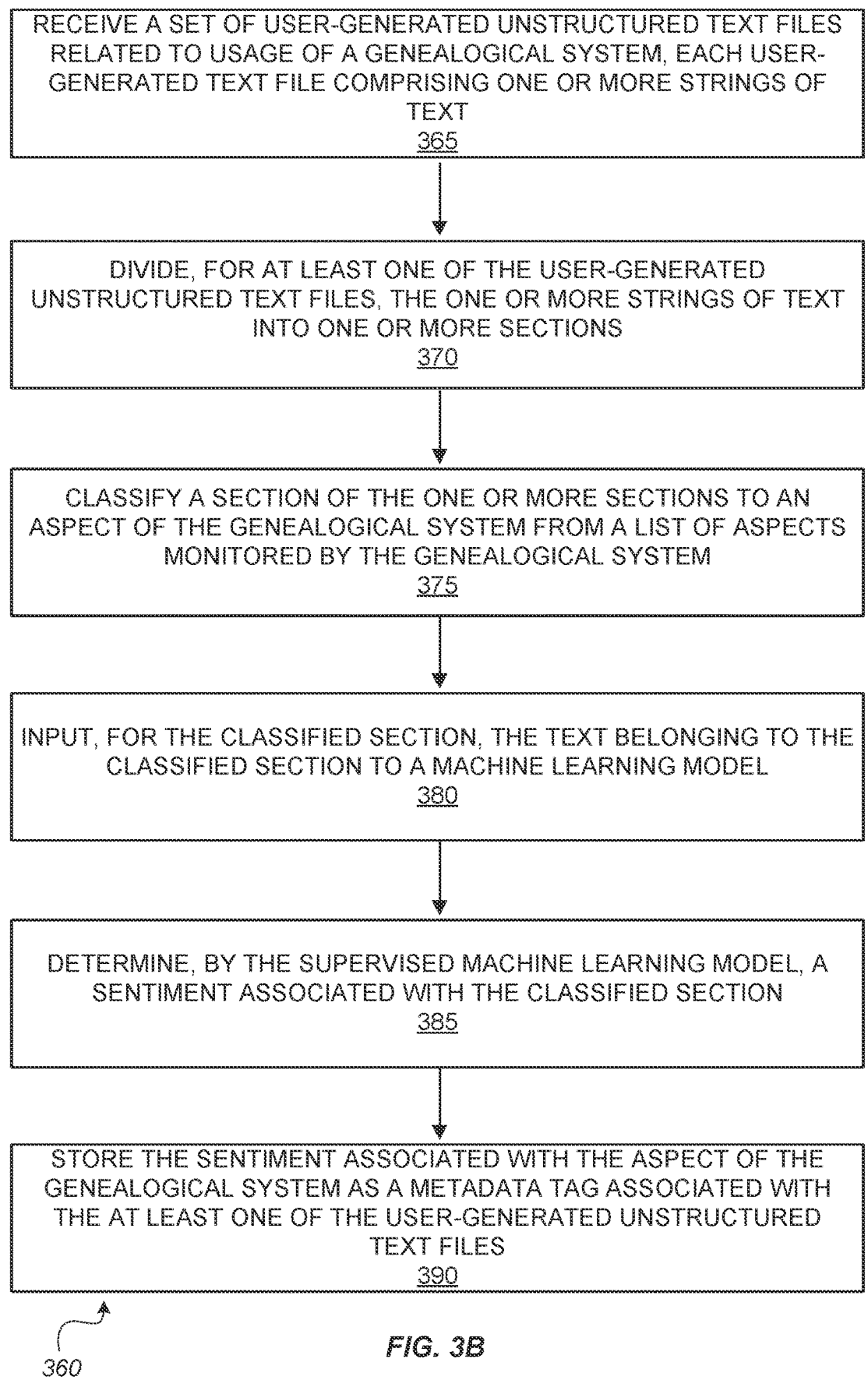

Referring to FIG. 3B, in some embodiments the computing server 130 is configured to monitor a list of aspects in user survey responses. Examples of different aspects may include different types of services provided by the genealogical system, such as family tree, DNA services, identifying matches, genealogy research, etc. Additional aspects may include different natures of a service, such as user experience, speed of the system, pricing, community integration, etc. The process 300 described above may be simplified by allowing the genealogical system to generate a set of relevant aspects for a new feature or by allowing manual input of key phrases and features to monitor. The computing server 130 may generate key phrases associated with aspects found in the genealogical system. For example, the computing server 130 may extract key phrases from the titles of modules in the genealogical system. The computing server 130 may generate key phrases randomly from text embedded in the genealogical system. In some embodiments, the key phrases are manually input. For example, an administrator of the genealogical system may provide a list of key phrases pertinent to a new feature or a feature of interest. The key phrases may be relevant to a given aspect of the genealogical system, such as family trees, user payments, user interfaces, etc. Each key phrase may be associated with an aspect, or feature, of the genealogical system.

The computing server 130 may receive 365 a set of user-generated unstructured text files related to the usage of the genealogical system. For example, the text files may include user survey responses that include forms, multiple choices, and open-ended comments that may be in unstructured text. Each text file includes strings of text (e.g., a word, sentence, paragraph, etc.). To process the text files, the computing server 130 divides 370 the strings of text into sections. Each section may correspond to given aspects of the genealogical system. For example, the computing server 130 may identify terms including "pay," "money," and "cost," as associated with similar features related to user payments. The computing server 130 sections of text including such terms or key phrases. In other examples, the computing server 130 may divide one section regarding comments related to the family tree service, another section regarding comments related to genealogy research, and yet another section regarding comments related to the DNA analysis service. The division of sections may be performed by a machine learning model that is discussed above and/or may include one or more key phrase extraction processes that are discussed in process 300.

The computing server 130 classifies 375 a section to an aspect of the genealogical system from a list of aspects monitored by the genealogical system. The computing server 130 may monitor aspects including different features of the genealogical system. Aspects may include at least user interfaces, new and existing modules, user services, and characteristics of the genealogical system. Each section of the text file may be classified based on the key phrases identified in the section. For example, the computing server 130 may identify key phrases concerning the family tree service, such as the phrase "pedigree" in a given section. The computing server 130 may then classify the section as related to family tree.

In some embodiments, the computing server 130 inputs 380 the text belonging to the classified section to a machine learning model. As described throughout this disclosure, the computing server 130 may use a wide variety of machine learning techniques for natural language processing. The computing server 130 determines 385 a sentiment associated with the classified section. The computing server 130 may determine that the text includes a negative sentiment towards the aspect. In some embodiments, the computing server 130 may generate a sentiment score with a lower score indicating a negative sentiment (e.g., a score between −1 and 1, 0 and 10, 0 and 100, −10 and 10, etc.). The sentiment may be between a first score and a second score. The sentiment may alternatively be a category such as "negative", "neutral", or "positive."

The computing server 130 may store 390 the sentiment associated with the aspect of the genealogical system as a metadata tag associated with the user generated unstructured text file. In some embodiments, each user generated unstructured text file, associated classified sections, and determined sentiments are stored as training examples for a machine learning model. The machine learning model may be the same as that used to determine 385 the sentiment score. The machine learning model may be iteratively trained to determine a sentiment for input unstructured text files based on stored sentiments. The stored sentiment associated with an aspect of the genealogical system may be used to determine a broader analysis of user sentiment. In some embodiments, the stored sentiment is combined with other stored sentiments concerning a monitored aspect of the genealogical system. The sentiment scores of many unstructured text files may be averaged or summed to determine a broader sentiment towards an aspect from general users towards the genealogical system.

In some embodiments, the process 300 described in FIG. 3A is supplemented with the method 360 illustrated in FIG. 3B. The system 300 may begin with a baseline set of aspects to monitor to orient the identification of novel themes. Phrases identified 350 in the process 300 may be associated with the baseline set of aspects or they may be classified as novel themes. User feedback containing novel themes may be analyzed to identify areas of the genealogical system that may require modification or other attention.

Example Model Training

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), transformer models, language models such as large language models (LLM), recurrent neural networks (RNN) and long short-term memory networks (LSTM), may also be used. For example, various key phrase extraction performed by a language model, sentiment analysis performed by a sentiment classifier, and other processes may apply one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to determine sentiment, the training samples may be unstructured text with manually identified sentiment scores (e.g., survey responses that are manually reviewed by scorers). The labels for each training sample may be binary or multi-class. In training a machine learning model for sentiment analysis, the training labels may include a positive label that indicates sentiment is positive and a negative label that indicates sentiment is negative. In some embodiments, the training labels may also be a score such as a sentiment score range.

By way of example, the training set may include multiple past records (e.g., past survey responses or other text files) with known outcomes (e.g., known important key phrases to be extracted, known sentiment scores). Each training sample in the training set may correspond to a past and the corresponding outcome may serve as the label for the sample. A training sample may be represented as a feature vector that includes multiple dimensions. Each dimension may include data of a feature, which may be a quantized value of an attribute that describes the past record. For example, in a machine learning model that is used to determine sentiment, the features in a feature vector may include embeddings in the text file or relevant section, user features such as features of the user that provided the text, structured question responses in the surveys, etc. In various embodiments, certain pre-processing techniques may be used to normalize the values in different dimensions of the feature vector.

In some embodiments, an unsupervised learning technique may be used. The training samples used for an unsupervised model may also be represented by features vectors, but may not be labeled. Various unsupervised learning techniques such as clustering may be used in determining similarities among the feature vectors, thereby categorizing the training samples into different clusters. In some cases, the training may be semi-supervised with a training set having a mix of labeled samples and unlabeled samples.

A machine learning model may be associated with an objective function, which generates a metric value that describes the objective goal of the training process. The training process may intend to reduce the error rate of the model in generating predictions. In such a case, the objective function may monitor the error rate of the machine learning model. In a model that generates predictions, the objective function of the machine learning algorithm may be the training error rate when the predictions are compared to the actual labels. Such an objective function may be called a loss function. Other forms of objective functions may also be used, particularly for unsupervised learning models whose error rates are not easily determined due to the lack of labels. In some embodiments, in sentiment analysis, the objective function may correspond to comparing the predicted sentiment scores to actual sentiment scores. In various embodiments, the error rate may be measured as cross-entropy loss, L1 loss (e.g., the sum of absolute differences between the predicted values and the actual value), L2 loss (e.g., the sum of squared distances).

Figure 5:
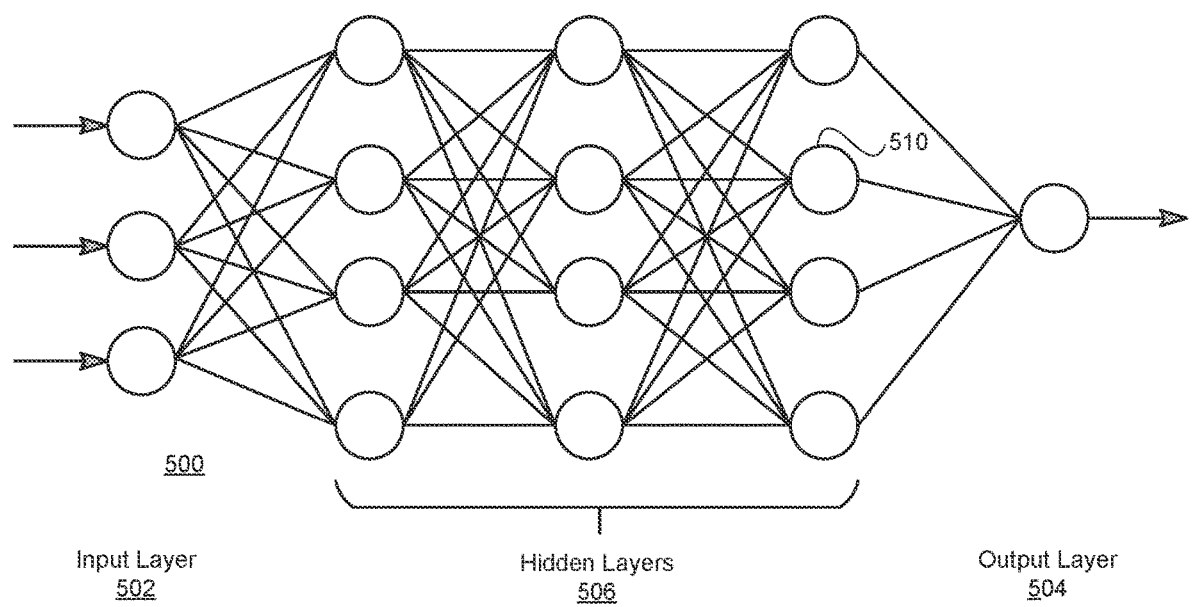
FIG. 5 illustrates a structure of an example convolutional neural network (CNN), in accordance with some embodiments.

Referring to FIG. 5, a structure of an example neural network is illustrated, in accordance with some embodiments. The neural network 500 may receive an input and generate an output. The input may be the feature vector of a training sample in the training process and the feature vector of an actual case when the neural network is making an inference. The output may be the prediction, classification, or another determination performed by the neural network. The neural network 500 may include different kinds of layers, such as convolutional layers, pooling layers, recurrent layers, fully connected layers, and custom layers. A convolutional layer convolves the input of the layer (e.g., an image) with one or more kernels to generate different types of images that are filtered by the kernels to generate feature maps. Each convolution result may be associated with an activation function. A convolutional layer may be followed by a pooling layer that selects the maximum value (max pooling) or average value (average pooling) from the portion of the input covered by the kernel size. The pooling layer reduces the spatial size of the extracted features. In some embodiments, a pair of convolutional layer and pooling layer may be followed by a recurrent layer that includes one or more feedback loops. The feedback may be used to account for spatial relationships of the features in an image or temporal relationships of the objects in the image. The layers may be followed by multiple fully connected layers that have nodes connected to each other. The fully connected layers may be used for classification and object detection. In one embodiment, one or more custom layers may also be presented for the generation of a specific format of the output. For example, a custom layer may be used for image segmentation for labeling pixels of an image input with different segment labels.

The order of layers and the number of layers of the neural network 500 may vary in different embodiments. In various embodiments, a neural network 500 includes one or more layers 502, 504, and 506, but may or may not include any pooling layer or recurrent layer. If a pooling layer is present, not all convolutional layers are always followed by a pooling layer. A recurrent layer may also be positioned differently at other locations of the CNN. For each convolutional layer, the sizes of kernels (e.g., 3×3, 5×5, 7×7, etc.) and the numbers of kernels allowed to be learned may be different from other convolutional layers.

A machine learning model may include certain layers, nodes 510, kernels and/or coefficients. Training of a neural network, such as the NN 500, may include forward propagation and backpropagation. Each layer in a neural network may include one or more nodes, which may be fully or partially connected to other nodes in adjacent layers. In forward propagation, the neural network performs the computation in the forward direction based on the outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Training of a machine learning model may include an iterative process that includes iterations of making determinations, monitoring the performance of the machine learning model using the objective function, and backpropagation to adjust the weights (e.g., weights, kernel values, coefficients) in various nodes 510. For example, a computing device may receive a training set that includes past survey responses or other past text files with known outcomes. Each training sample in the training set may be assigned with labels indicating the outcomes such as the sentiments. The computing device, in a forward propagation, may use the machine learning model to generate predicted sentiments. The computing device may compare the predicted sentiments with the labels of the training sample. The computing device may adjust, in a backpropagation, the weights of the machine learning model based on the comparison. The computing device backpropagates one or more error terms obtained from one or more loss functions to update a set of parameters of the machine learning model. The backpropagating may be performed through the machine learning model and one or more of the error terms based on a difference between a label in the training sample and the generated predicted value by the machine learning model.

By way of example, each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other samples in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples. The trained machine learning model can be used for performing sentiment analysis, key phrase extraction, or another suitable task for which the model is trained.

In various embodiments, the training samples described above may be refined and continue to re-train the model, which is the model's ability to perform the inference tasks. In some embodiments, this training and re-training process may repeat, which results in a computer system that continues to improve its functionality through the use-retraining cycle. For example, additional survey responses and other text files may be continuously received by the computing server 130. Those new training samples may be used to re-train the machine learning model.

Training of an unsupervised model, such as clustering may also be similar, which involves the maximization or minimization of the objective function by iteratively changing the boundary of the clusters.

Selection of Models and Features

To evaluate which embedding method works best for the computing server 130 use case, the computing server 130 may first compare extracted key phrases to the labeled data the computing server 130 used for training the supervised model. In some embodiments, this comparison may not be feasible because most responses have multiple tags that create many unique categories. The computing server 130 then conducts an evaluation without using any labeled data by determining how well separated the clusters are and how well the key phrases represent the topics covered by a cluster.

The computing server 130 may determine how well separated are the clusters generated by using a particular embedding method. The computing server 130 determines the cluster separation with metrics such as the silhouette score. The computing server 130 may use the silhouette score as a metric to determine the number of clusters, as well.

The computing server 130 may determine how well the key phrases represent the topics covered by a cluster. The computing server 130 may compare the similarity between cluster centroids, and the average embedding of the top key phrases in each cluster. To summarize this metric for all the clusters, the computing server 130 determines the weighted average of the similarity scores between cluster centroids and the average keyphrase embeddings. The computing server 130 calls this metric "cluster coverage". The absolute value of this metric for a particular method may not indicate the quality of them model's performance but may be a good way to compare the performance of different models. Mathematically, $$\text{Coverage} = \frac{1}{\sum_{i=1}^{|C|} w_i} \sum_{i=1}^{|C|} w_i sim(A_{C_i}, C_i)$$

where,
C=Set of all clusters
$w_i$=Number of responses in cluster i
$C_i$=Centroid of cluster i
$A_{C_i}$=Average embedding of top k key phrases for cluster i Results In some embodiments, based on both silhouette scores and cluster coverage, using the SentenceBERT model to embed survey responses yields the best results.

| Method | Number of Clusters | Silhouette Score | Coverage Score |
|---|---|---|---|
| Avg. GloVe | 50 | 0.02797 | 0.04783 |
| Universal Sentence Encoder(USE) | 40 | 0.02679 | 0.01395 |
| Sentence BERT(SBert) | 30 | 0.02922 | 0.0705 |

Figure 6:
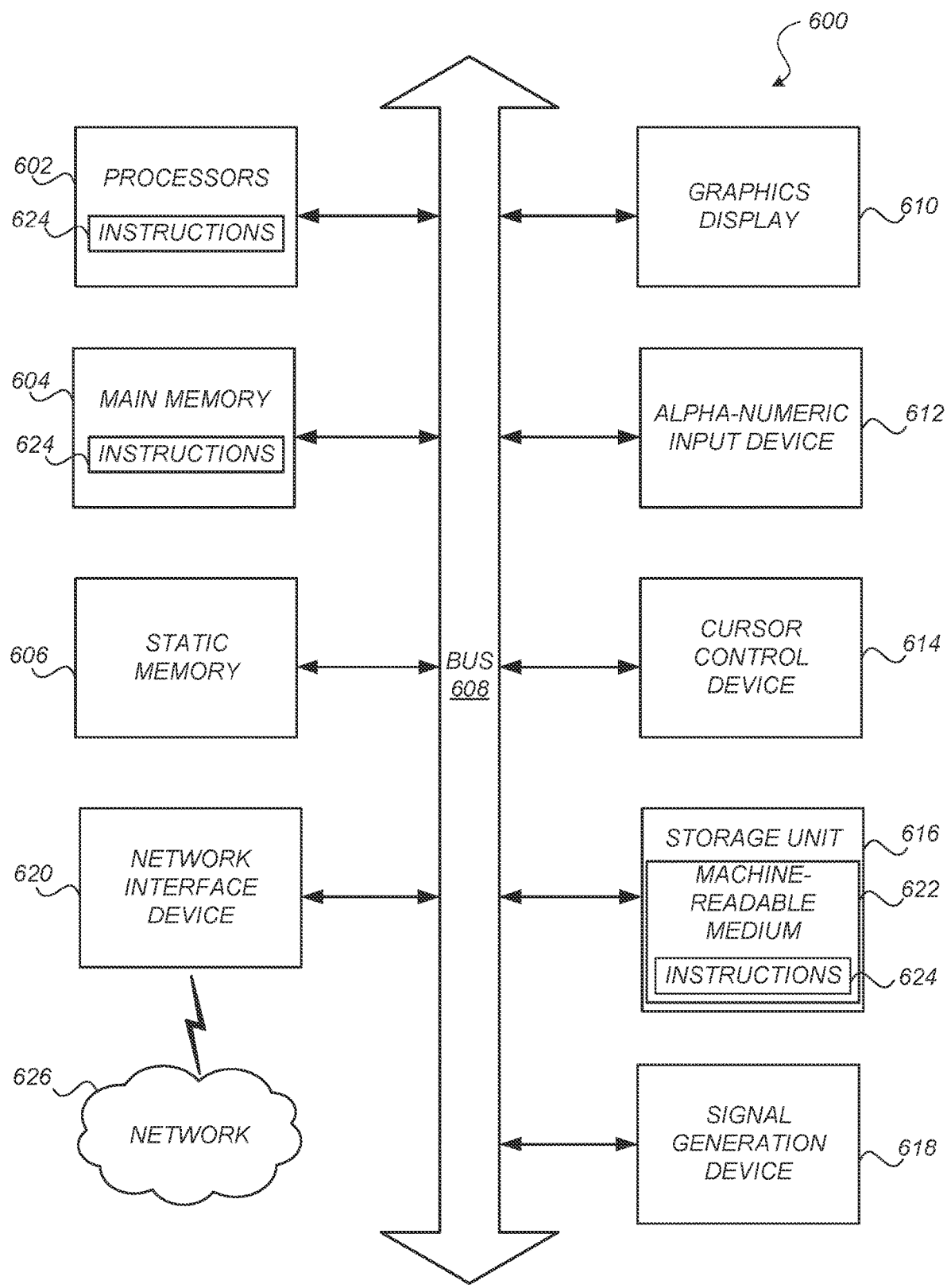
FIG. 6 is a block diagram of an example computing device, in accordance with some embodiments.

In some embodiments, the model performance may be further evaluated manually. The computing server 130 could show labelers a survey response, and ask them to choose which keyphrase (GloVe, USE or SBert) best represents the key idea of the response. Another metric may be similar to the coverage metric described above, however the metric may also evaluate performance response by response (i.e. response coverage). For each response, the computing server 130 picks the keyphrase from the cluster that has a maximum cosine similarity and averages these similarity scores across clusters. The keyphrase extraction process may also be improved. Instead of concatenating all responses, if the computing server 130 may consider each cluster instead as a "bag of documents", the quality of the extracted key phrases may be improved.

$$RC = \frac{1}{|C|} \sum_{J=1}^{|C|} \frac{1}{|C_J|} \sum_{i=1}^{|C_J|} \max_{k=1}^{|k_j|} sim(E(r_i), E(p_k))$$

where,
C=Set of all clusters found
E=Embedding functions (i.e., GloVe, SBERT, USE etc)
$K_j$=Centroid of cluster i
$r_i = i^{th}$ survey response in $C_j$ Computing Machine Architecture FIG. 6 is a block diagram illustrating components of an example computing machine that is capable of reading instructions from a computer-readable medium and execute them in a processor (or controller). A computer described herein may include a single computing machine shown in FIG. 6, a virtual machine, a distributed computing system that includes multiple nodes of computing machines shown in FIG. 6, or any other suitable arrangement of computing devices.

By way of example, FIG. 6 shows a diagrammatic representation of a computing machine in the example form of a computer system 600 within which instructions 624 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 6 may correspond to any software, hardware, or combined components shown in FIGS. 1 and 2, including but not limited to, the client device 110, the computing server 130, and various engines, interfaces, terminals, and machines shown in FIG. 2. While FIG. 6 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 624 that specify actions to be taken by that machine. Further, while only a single machine is illustrated, the term "machine" and "computer" may also be taken to include any collection of machines that individually or jointly execute instructions 624 to perform any one or more of the methodologies discussed herein.

The example computer system 600 includes one or more processors 602 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 600 may also include a memory 604 that store computer code including instructions 624 that may cause the processors 602 to perform certain actions when the instructions are executed, directly or indirectly by the processors 602. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 602 and reduces the space required for the memory 604. For example, the database processing techniques and machine learning methods described herein reduce the complexity of the computation of the processors 602 by applying one or more novel techniques that simplify the steps in training, reaching convergence, and generating results of the processors 602. The algorithms described herein also reduces the size of the models and datasets to reduce the storage space requirement for memory 604.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors.

The computer system 600 may include a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The graphics display unit 610, controlled by the processors 602, displays a graphical user interface (GUI) to display one or more results and data generated by the processes described herein. The computer system 600 may also include alpha-numeric input device 612 (e.g., a keyboard), a cursor control device 614 (e.g., a mouse, a trackball, a joystick, a motion sensor, or other pointing instruments), a storage unit 616 (a hard drive, a solid-state drive, a hybrid drive, a memory disk, etc.), a signal generation device 618 (e.g., a speaker), and a network interface device 620, which also are configured to communicate via the bus 608.

The storage unit 616 includes a computer-readable medium 622 on which is stored instructions 624 embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting computer-readable media. The instructions 624 may be transmitted or received over a network 626 via the network interface device 620.

While computer-readable medium 622 is shown in an example embodiment to be a single medium, the term "computer-readable medium" should be taken to include a single medium or multiple media (e.g., a centralized or distributed database, or associated caches and servers) able to store instructions (e.g., instructions 624). The computer-readable medium may include any medium that is capable of storing instructions (e.g., instructions 624) for execution by the processors (e.g., processors 602) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g., method, can be claimed in another claim category, e.g., computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6) U.S. Pat. No. 11,429,615, entitled "Linking Individual Datasets to a Database," granted on Aug. 30, 2022, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

What is claimed is:

1. A computer-implemented method, comprising:
receiving, from user accounts of a genealogical system distributing genealogical survey questions, a plurality of genealogical survey responses comprising genealogical data relevant to the user accounts;
generating, utilizing a first neural network, a plurality of embedding vectors representing the plurality of genealogical survey responses, each embedding vector representing semantic characteristics of one of the plurality of genealogical survey responses;
clustering, utilizing a machine learning clustering model, the plurality of embedding vectors into a plurality of clusters according to embedding space densities corresponding to the plurality of embedding vectors representing the plurality of genealogical survey responses;
predicting, utilizing a second neural network, genealogical data themes for the plurality of clusters;
identifying a key phrase representing a genealogical data theme from among the genealogical data themes by utilizing an objective function that promotes diversity among key phrases selected from the plurality of clusters; and
determining, from among the plurality of genealogical survey responses, a genealogical survey response corresponding to the key phrase based on the genealogical data theme of the key phrase.

2. The computer-implemented method of claim 1, wherein generating the plurality of embedding vectors representing the plurality of genealogical survey responses comprises:
receiving a plurality of genealogical survey responses each comprising at least one paragraph of text;
generating, utilizing the first neural network, word embeddings for words in the at least one paragraph of text for each of the plurality of genealogical survey responses; and
aggregating the word embeddings to generate a single vector representing the plurality of genealogical survey responses.

3. The computer-implemented method of claim 2, wherein identifying the key phrase representing the genealogical data theme from among the genealogical data themes comprises utilizing a third neural network trained on a plurality of genealogical survey responses.

4. The computer-implemented method of claim 3, wherein identifying the key phrase representing the genealogical data theme from among the genealogical data themes further comprises identifying, utilizing the third neural network trained on a plurality of genealogical survey responses, a key phrase relevant to an aspect of the genealogical system.

5. The computer-implemented method of claim 1, wherein clustering the plurality of embedding vectors into the plurality of clusters comprises:
defining an objective function that measures metrics of potential clusters; and
defining iteratively the potential clusters to change values of the objective function based on a training goal.

6. The computer-implemented method of claim 5, wherein the metrics of the objective function are distances among the plurality of embedding vectors in a potential cluster.

7. The computer-implemented method of claim 1, wherein identifying the key phrase representing the genealogical data theme from among the genealogical data themes comprises:
generating a plurality of candidate keyphrase vectors, wherein each keyphrase vector of the plurality of candidate keyphrase vectors comprises one or more words extracted from the plurality of genealogical survey responses belonging to at least one cluster of the plurality of clusters; and
identifying one or more candidate keyphrase vectors from the plurality of candidate keyphrase vectors that are most similar to the at least one cluster.

8. The computer-implemented method of claim 7, further comprising generating the plurality of candidate keyphrase vectors using a sliding window approach that goes through text of the plurality of genealogical survey responses.

9. The computer-implemented method of claim 7, wherein identifying the one or more candidate keyphrase vectors is based on cosine similarity between a candidate keyphrase vector of the plurality of candidate keyphrase vectors and a center of the at least one cluster.

10. A system comprising:
one or more processors; and
memory configured to store computer code comprising instructions, the instructions, when executed by one or more processors, cause the one or more processors to:
receive, from user accounts of a genealogical system distributing genealogical survey questions, a plurality of genealogical survey responses comprising genealogical data relevant to the user accounts;
generate, utilizing a first neural network, a plurality of embedding vectors representing the plurality of genealogical survey responses, each embedding vector representing semantic characteristics of one of the plurality of genealogical survey responses;

cluster, utilizing a machine learning clustering model, the plurality of embedding vectors into a plurality of clusters according to embedding space densities corresponding to the plurality of embedding vectors representing the plurality of genealogical survey responses;

predict, utilizing a second neural network, genealogical data themes for the plurality of clusters;

identify a key phrase representing a genealogical data theme from among the genealogical data themes by utilizing an objective function that promotes diversity among key phrases selected from the plurality of clusters; and determine, from among the plurality of genealogical survey responses, a genealogical survey response corresponding to the key phrase based on the genealogical data theme of the key phrase.

11. The system of claim 10, wherein generating the plurality of embedding vectors representing the plurality of genealogical survey responses comprises:

receiving a plurality of genealogical survey responses each comprising at least one paragraph of text;

generating, utilizing the first neural network, word embeddings for words in the at least one paragraph of text for each of the plurality of genealogical survey responses; and aggregating the word embeddings to generate a single vector representing the plurality of genealogical survey responses.

12. The system of claim 10, wherein identifying the key phrase representing the genealogical data theme from among the genealogical data themes comprises utilizing a third neural network trained on a plurality of genealogical survey responses.

13. The system of claim 10, wherein clustering the plurality of embedding vectors into the plurality of clusters comprises:

defining an objective function that measures metrics of potential clusters; and defining iteratively the potential clusters to change values of the objective function based on a training goal.

* * * * *